United States Patent [19]

Birbara et al.

[11] Patent Number: 5,492,683
[45] Date of Patent: Feb. 20, 1996

[54] REGENERABLE SUPPORTED AMINE-POLYOL SORBENT

[75] Inventors: Philip J. Birbara, Windsor Locks; Timothy A. Nalette, Tolland, both of Conn.

[73] Assignee: United Technologies Corporation, Windsor Locks, Conn.

[21] Appl. No.: 307,968

[22] Filed: Sep. 16, 1994

Related U.S. Application Data

[62] Division of Ser. No. 989,277, Dec. 11, 1992, Pat. No. 5,376,614.

[51] Int. Cl.$^6$ .......................... B01D 53/04; B01D 53/34
[52] U.S. Cl. ..................... 423/230; 423/228; 423/229
[58] Field of Search ................................. 423/228, 229, 423/230

[56] References Cited

U.S. PATENT DOCUMENTS

| | | | |
|---|---|---|---|
| 2,848,309 | 8/1958 | Hay | 423/230 |
| 2,992,703 | 7/1961 | Vasan et al. | 423/230 |
| 5,376,614 | 12/1994 | Birbara et al. | 502/402 |
| 5,378,439 | 1/1995 | Delobel et al. | 423/230 |

*Primary Examiner*—Anthony McFarlane
*Attorney, Agent, or Firm*—McCormick, Paulding & Huber

[57] ABSTRACT

The supported amine-polyol sorbent of the present invention comprises about 1 wt. % to about 25 wt. % amine, about 1 wt. % to about 25 wt. % polyol, with the balance being support. This sorbent is capable of absorbing and desorbing carbon dioxide at relatively high rates at ambient temperatures, thereby improving carbon dioxide sorption capacity.

7 Claims, 2 Drawing Sheets

REGENERABLE SUPPORTED AMINE-POLYOL SORBENT

This is a division of application Ser. No. 07/989,277 filed on Dec. 11, 1992, now U.S. Pat. No. 5,376,614.

TECHNICAL FIELD

The present invention relates to a sorbent for absorbing carbon dioxide and especially relates to a regenerable supported amine-polyol sorbent for absorbing carbon dioxide.

BACKGROUND OF THE INVENTION

Carbon dioxide partial pressures exceeding about 7.6 mm Hg (millimeters of mercury; partial pressure of about 1%), for extended periods of time, are known to cause health problems in humans and other mammals. As a result, carbon dioxide partial pressures are typically maintained below about 1% via the use of regenerable and nonregenerable carbon dioxide sorbents such as soda lime, molecular sieves, solid oxide sorbents, alkali metal carbonates, alkali metal hydroxides, amine sorbents, and combinations thereof, among others.

In the enclosed environment provided by a submarine, amines, such as monoethanolamine and diethanolamine, are often used to reduce carbon dioxide partial pressures via absorption. These amines are utilized in the aqueous phase, typically 25 wt. % (weight percent) to 30 wt. % amine. The amine solution enters the top of an absorption tower while the carbon dioxide containing gaseous stream is introduced to the bottom. While intimately contacting the gaseous stream in a countercurrent fashion, the amine solution chemically absorbs the carbon dioxide from the gaseous stream. Desorption of the absorbed carbon dioxide then proceeds via a thermal regeneration process at temperatures in excess of about 150° F. (about 66° C.). During desorption, carbon dioxide and water evolve from the amine solution and are separated by condensing the water vapor in a heat exchanger. Once regenerated, the amine solution is recycled back to the absorption tower for additional carbon dioxide absorption.

Although this amine solution is capable of initially removing carbon dioxide to partial pressures below about 1%, it has a limited life due to degradation through oxidation of the amine. Oxygen present in the gas stream oxidizes the amine particularly during desorption when the sorbent is heated. This oxidation is believed to reduce the amount of amine primary and secondary functional groups available for carbon dioxide absorption. Consequently, the amine solution's useful life is limited to only about six months of continuous use.

In contrast, if desorption is accomplished at ambient temperatures, the amine solution's life will be extended, however, performance will be limited by low desorption rates. Due to both energy requirements and oxidation related degradation, amine sorbents utilized in closed environment systems are often regenerated at approximately ambient temperatures for a fixed desorption time. At ambient temperatures, the desorption of carbon dioxide is often limiting. Under these conditions, the desorption process will typically have insufficient time to fully desorb the absorbed carbon dioxide. Consequently, a portion of the absorbed carbon dioxide remains in the sorbent after the desorption process is complete, thereby reducing the capacity of the sorbent to absorb additional carbon dioxide. As a result, a decreasing portion of the carbon dioxide sorbent is used throughout the absorption-desorption cyclical process.

What is needed in the art is a regenerable carbon dioxide sorbent having high carbon dioxide removal rates and high desorption rates at ambient temperatures, and having a sorbent life exceeding about 2 years of continuous use.

DISCLOSURE OF THE INVENTION

The present invention relates to a supported amine polyol sorbent. This sorbent comprises about 1 wt. % to about 25 wt. % polyol and about 1 wt. % to about 25 wt. % amine, with the balance being support.

The present invention further relates to a method for forming a supported amine-polyol sorbent. This method comprises wetting a support, contacting said wetted support with amine and polyol to form an amine-polyol mixture, drying the amine-polyol mixture to deposit the amine and the polyol on the support, thereby forming the supported amine-polyol sorbent.

The present invention additionally relates to a cyclical carbon dioxide removal process. This process comprises passing a gas stream containing carbon dioxide through a sorbent bed of the above-described supported amine-polyol sorbent. Carbon dioxide is absorbed from the gaseous stream into the supported amine-polyol sorbent. The absorbed carbon dioxide is then desorbed to regenerate the sorbent.

The foregoing and other features and advantages of the present invention will become more apparent from the following description and accompanying drawings.

Figure 1:
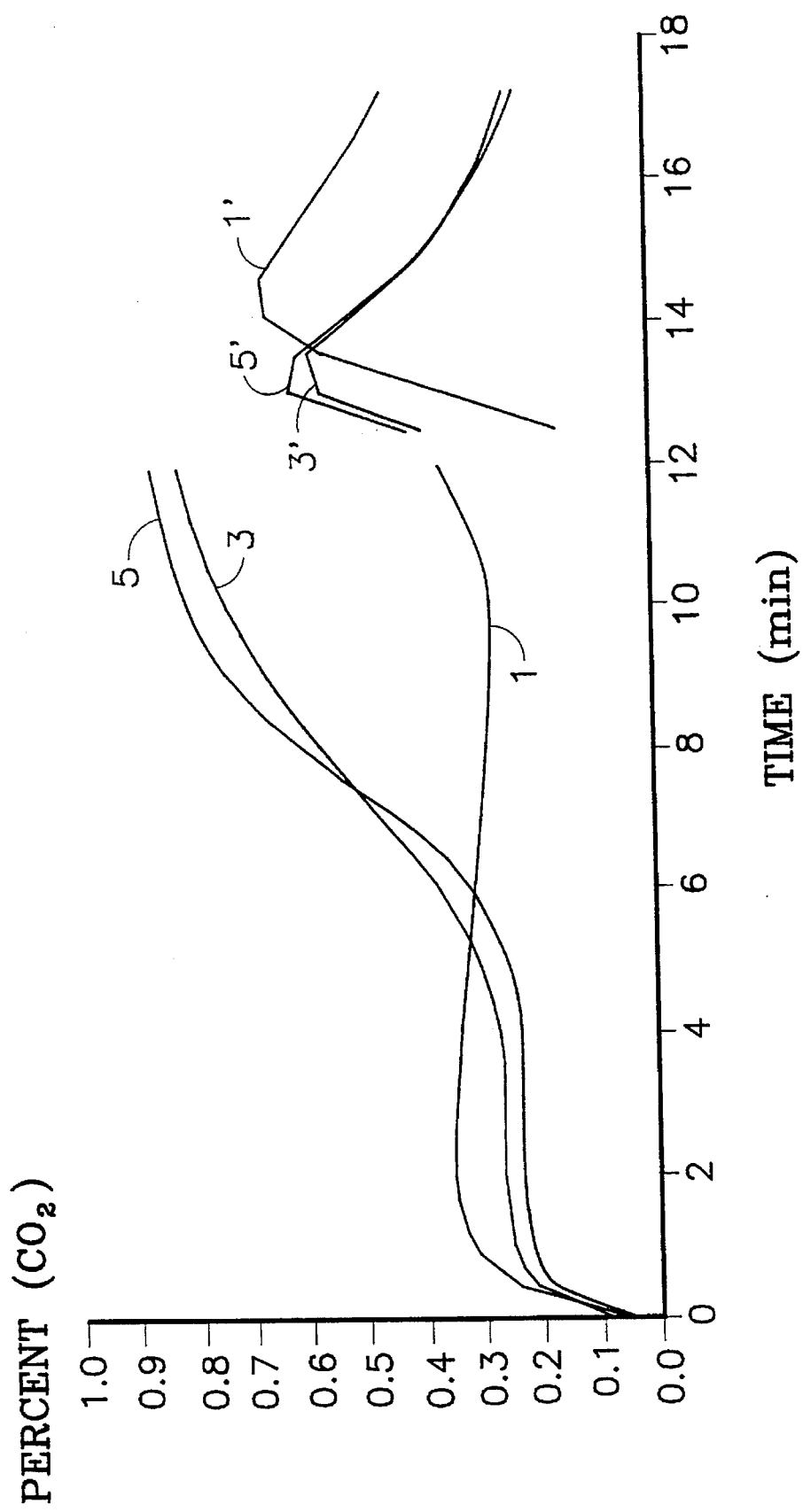
FIG. 1 is a graph of the absorption-desorption cycles of the supported amine-polyol sorbent of the present invention and of two prior art amine sorbents which shows the percentage of carbon dioxide remaining in a gaseous stream after absorption and the percentage of carbon dioxide during desorption.

These figures are meant to be exemplary, and not to limit the general scope of the present invention.

BEST MODE FOR CARRYING OUT THE INVENTION

The present invention relates to a regenerable supported amine-polyol sorbent-for absorbing carbon dioxide at near ambient temperatures. This sorbent comprises an amine which absorbs and desorbs carbon dioxide and water from a gaseous stream, a polyol, polyglycol and/or polyglycol (hereinafter referred to as polyol) which increases the carbon dioxide desorption rate of the amine, and a support which provides structural integrity to the amine and polyol. Essentially, the amine chemically absorbs carbon dioxide and water upon contact with a gaseous stream, thereby forming an amine complex. Then, due to carbon dioxide partial pressure gradients within the amine solution, the absorbed carbon dioxide migrates to areas of lower carbon dioxide concentration.

Since pure amine is typically highly viscous, about 10,000 cps (centipoise) or greater, the diffusion of the carbon dioxide and water to the unreacted amine is slow. Consequently, lowering of the amine's viscosity is desirable to improve diffusion rates and therefore efficiency. Viscosity reduction is accomplished by mixing the amine with a polyol which has a relatively low viscosity of less than about 50 cps. By decreasing the amine's viscosity the diffusional resistance through the amine is reduced and carbon dioxide desorption rates are thereby increased.

The amine is a polymer having a relatively high molecular weight, greater than about 500 with greater than about 1,000 preferred. Although lower molecular weight amines could be utilized to absorb carbon dioxide, these amines have high volatility, typically above about 0.10 mm Hg, and therefore would contaminate the gas stream and would have a decreased life due to the amount of amine lost due to volatilization. Since the primary and secondary functional amine groups are the carbon dioxide absorption groups, the amine should possess sufficient primary and secondary functional amine groups for carbon dioxide absorption. The preferred characteristics of this amine include: low volatility, nontoxicity, and the ability to absorb carbon dioxide from relatively low partial pressures of less than 7.6 mm Hg down to negligible levels (typically below about 0.1 mm Hg or lower). Generally, the amine's volatility is below about 0.5 mm Hg, with below about 0.01 mm Hg at 20° C. preferred since minimizing the amine's volatility minimizes the loss of amine during the absorption/desorption process due to volatilization. Typical amines include 2-amino-2-methyl-1,3-propanediol, 2-hydroxyethyl piperazine, methyldiethanolamine, monoethanolamine, polyethylene imines, tetraethylenepentamine, triethanolamine, polyethylene imine, mixtures thereof, and others, with polyethylene imine preferred.

The polyol enhances the sorption kinetics by reducing the viscosity of the amine which decreases diffusional resistance thereby enhancing carbon dioxide and water migration to the amine. The polyol is additionally believed to improve sorbent life by reducing the exposure of the amine to oxygen in the gaseous stream, thereby inhibiting oxidation of the amine. Preferred polyol characteristics include: hygroscopic properties, negligible vapor pressure, below about 0.01 mm Hg (millimeters of mercury) at ambient temperatures of about 15° C. to about 40° C., chemical compatibility with the amine, capable of dissolving the amine, nontoxic, favorable absorption/desorption kinetics, and low viscosity. Possible polyols include, but are not limited to: cyclic ketone, esters, ethers, sugar alcohols, glycerols, glycols such as dimethyl ether of polyethylene glycol, methoxy triethylene glycol diacetate, polyethylene glycol, propylene carbonate, 1,2-propylene glycol, mixtures thereof, and others. The preferred polyol-amine combination to support human habitation within closed environments is a polyethylene glycol or glycerol and polyethylene imine. The hygroscopic nature and relatively low vapor pressure of the polyethylene glycol and glycerol and the very low vapor pressure of the polyethylene imine combine effectively and efficiently reduce carbon dioxide concentration to negligible levels.

The concentration of polyol in the final sorbent depends upon the amount of polyol necessary to sufficiently reduce the amine's viscosity, typically to below about 500 cps since such viscosities improve sorption kinetics. Meanwhile, the amount of amine required depends upon attaining sufficient carbon dioxide capacity with consideration being given to inefficiencies of the adsorption-desorption cycle and capacity lost due to degradation. Generally, a weight ratio of polyol to amine of about 1:1 to about 3:1, can be employed, with a ratio of about 1.2:1 to about 1.5:1 preferred. These ratios correspond to up to about 25 wt. % polyol and up to about 25 wt % amine with the balance being support, with about 10 wt. % to about 20 wt. % polyol and about 8 wt. % to about 15 wt. % amine with the balance being support, preferred.

Supports which are useful in practicing the present invention are standard support materials which are porous, having a surface area of about 50 $m^2/g$ (square meters per gram) to about 1,000 $m^2/g$ or greater. Preferred supports have a high surface area (above about 300 $m^2/g$), maximum porosity while retaining structural integrity, and preferably a polar nature. Possible supports include, alumina, zeolite and carbon molecular sieves, ion exchange resins, activated carbon, polymeric absorbent resins, such as acrylic ester polymers, polystyrene divinyl benzene, mixtures thereof, and other conventional supports. The preferred supports have a macroreticulate structure, such as an acrylic ester polymer, including AMBERLITE® produced by Roman Haas, Philadelphia, Pa., having a surface area of about 400 $m^2/g$ to about 500 $m^2/g$. This support has an average pore size of about 80 angstroms, a porosity of about 50%, and possesses surface characteristics which promote adhesion of the amine to the support through electrostatic bonds.

Formation of this sorbent can follow conventional processes such as impregnation and other common techniques. Impregnation includes wetting of the support with a supported amine-polyol solution or separate solutions of amine and polyol which wick into the support, and removing the solvent. Although complete solvent removal from the sorbent is not required, it is preferred, in the above mentioned formation techniques, that substantially all of the solvent be removed from the sorbent such that no residual solvent remains. Insufficient solvent removal can cause contamination of the habitable environment with solvent vapor since the solvent is highly volatile.

The solvent can be any solvent which easily wets the support, dissolves the amine and polyol, and is easily removed from the sorbent, preferably via evaporation. Alcohol based solvents are preferred since they are good wetting agents for the supports, are fully miscible and nonreactive with a majority of the amines and the polyols, and are easily removed via evaporation. These alcohol based solvents include: methyl alcohol, ethyl alcohol, isopropyl alcohol, and mixtures thereof, and others. Other possible solvents include nonreactive solvents such as water and hydrocarbon solvents, such as hexane.

Once the sorbent has been formed and the solvent has been removed, the sorbent is typically employed in a sorbent bed where a gaseous stream containing carbon dioxide and water contacts the sorbent. The carbon dioxide, water, and amine chemically react to form an amine complex, thereby removing the carbon dioxide and water from the gaseous stream. Once the amine is saturated, i.e. greater than about 80% of the amine has been converted to the amine complex, or at a designated cycle time, the sorbent bed is regenerated. Regeneration comprises ceasing the flow of the carbon dioxide contaminated gas stream through the bed and desorbing the absorbed carbon dioxide and water. The endothermic desorption reaction is accomplished by thermal and/or pressure gradient means.

Desorption comprises heating the bed to about 30° C. to about 50° C. and/or reducing the carbon dioxide partial pressure environment to below about 0.1 mm Hg by applying a vacuum and/or employing a carbon dioxide lean sweep gas, such as nitrogen, to remove the desorbed carbon dioxide and water. These temperature and carbon dioxide partial pressure gradients drive the reaction between the carbon dioxide, water, and amine in the reverse direction, thereby regenerating the amine and releasing the absorbed carbon dioxide and water. If the sorbent is heated, it is preferred to heat it in a low oxygen partial pressure environment to further reduce possible oxidation of the amine.

Use of the sorbent to absorb carbon dioxide and water can comprise utilizing two or more sorbent beds operating cyclically such that the first bed is in the absorption cycle while the second bed is in the desorption cycle. This allows for continuous carbon dioxide and water removal from the gaseous stream. For example, the sorbent of the present invention can be placed in a dual bed heat exchanger, such as a segmented and thermally connected dual bed heat exchanger. In the first bed of the heat exchanger, the sorbent is in the absorption cycle while the remainder of the sorbent is in the desorption cycle. In the absorption cycle, an exothermic reaction occurs between carbon dioxide and water in a gaseous stream which is flowing through the sorbent, thereby absorbing forming the amine complex. The heat produced during this absorption in the first bed is transferred to the second bed to drive the endothermic desorption of the absorbed carbon dioxide and water simultaneously occurring therein.

This entire process can be operated at about 5° C. (41° F.) to about 50° C. (122° F.), with ambient temperatures, about 20° C. (68° F.) to about 30° C. (86° F.), preferred due to decreased energy requirements and decreased oxidation of the amine under ambient conditions.

It should be noted that although water is not required in the gaseous stream, water is an essential part of the absorption reaction between the amine and the carbon dioxide. Therefore, if water is not present in the gaseous stream, sufficient water must either be present in the sorbent itself or be added to the system.

The present invention will be clarified with reference to the following illustrative examples. These examples are given to illustrate the preparation of the supported amine-polyol sorbent of the present invention. They are not, however, intended to limit the scope of the present invention.

EXAMPLE I

The following single impregnation technique was employed to form a supported amine-polyol sorbent comprised of 11 wt. % polyethylene imine, 16 wt. % triethylene glycol, and 73 wt. % AMBERLITE XAD-7.

1. 100 g of AMBERLITE was wetted with 200 ml of methyl alcohol by combining the AMBERLITE and alcohol and stirring for 5 minutes.
2. A solution of 14.7 g polyethylene imine, 22 ml triethylene glycol, and 40 ml methyl alcohol was prepared.
3. The solution and wetted AMBERLITE were combined and mixed for 15 minutes to form a substantially homogenous mixture.
4. The mixture was dried at 60° C. until the methyl alcohol is removed.

EXAMPLE II

The following sequential impregnation technique was employed to form a supported amine-polyol sorbent comprised of 11 wt. %polyethylene imine, 16 wt. % triethylene glycol, and 73 wt. % AMBERLITE XAD-7.

1. 100 g of AMBERLITE was wetted with 200 ml of methyl alcohol by combining the AMBERLITE and alcohol and stirring for 5 minutes.
2. An amine solution of 14.7 g polyethylene imine and 40 ml methyl alcohol was prepared.
3. The amine solution and wetted AMBERLITE were combined and mixed to form a substantially homogenous mixture.
4. A dilute solution of 22 ml triethylene glycol and 25 ml methyl alcohol was prepared and added to the mixture.
5. The glycol mixture was stirred to substantially homogeneously disperse the triethylene glycol throughout the AMBERLITE and form the sorbent.
6. The sorbent was dried at 60° C. for about 1 hour in a rotary flash evaporator, until all of the methyl alcohol was removed.

The sorbents produced in the above examples had a 75 g/hr carbon dioxide and water absorption and desorption rate when operated in a cyclic mode of 12 minutes such that 200 cc (cubic centimeters) of the sorbent was absorbing at about 30° C. while the remaining 200 cc of the sorbent was desorbing at about 30° C., bed residence times of 3 seconds, with ambient air flows containing 7.5 mm Hg of carbon dioxide and relative humidities of 50%.

Figure 2:
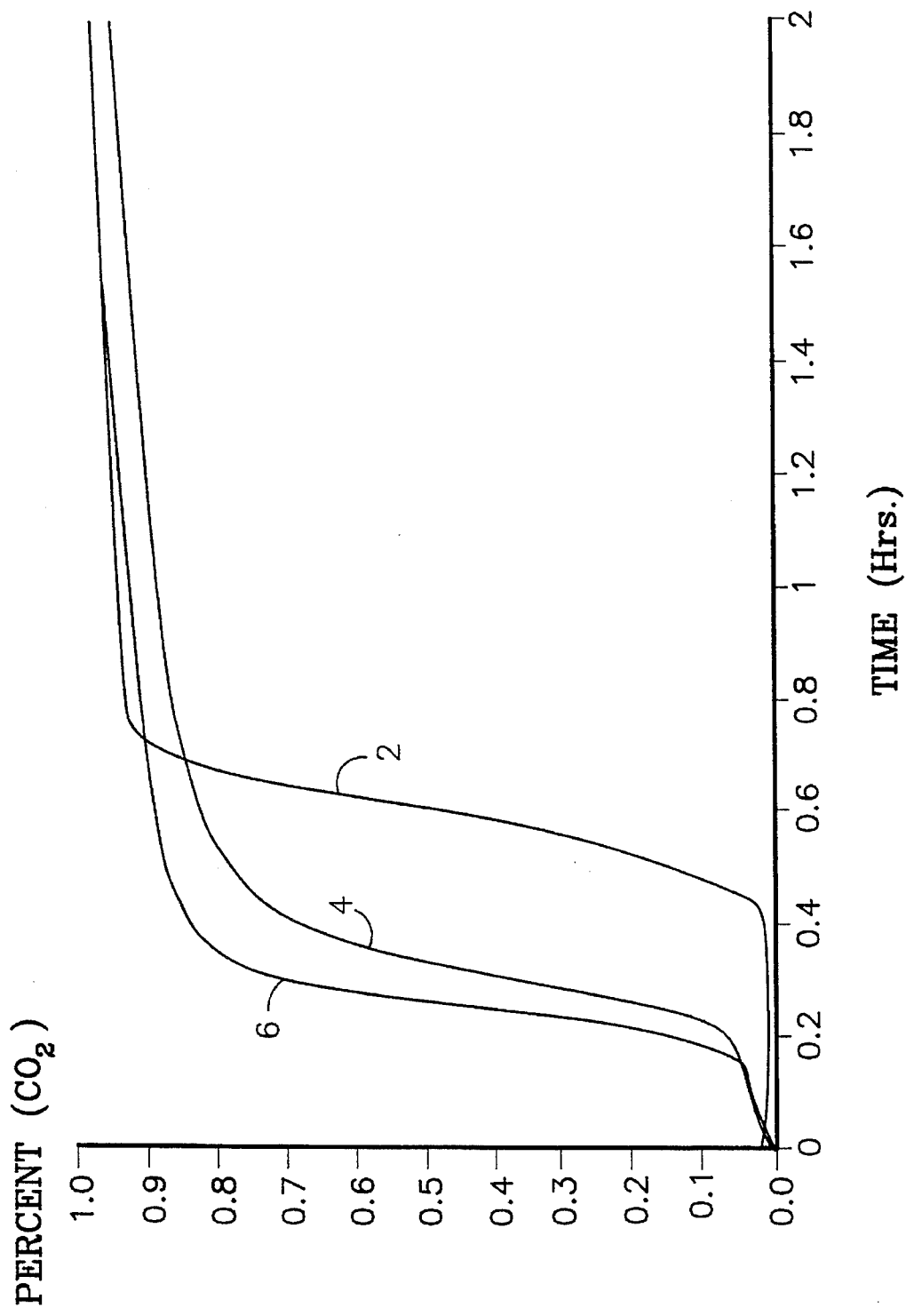
FIG. 2 is an equilibrium breakthrough comparison of the supported amine-polyol sorbent of the present invention versus two prior art amine sorbents.

Referring to FIGS. 1 and 2, lines 1, 1' and 2 refer to a supported amine-polyol sorbent of the present invention comprised of 12 wt. % polyethylene imine, 15 wt. % triethylene glycol, balance AMBERLITE XAD-7; lines 3, 3' and 4 refer to a prior art amine sorbent comprised of 26 wt. % polyethylene imine, balance AMBERLITE XAD-7; and lines 5, 5' and 6 refer to a prior art amine sorbent comprised of 13 wt. % polyethylene imine, balance AMBERLITE XAD-7.

In FIG. 1, which graphs cyclic absorption (time 1–12) and desorption (time 12–18) at 30° C., it can be seen that both of the prior art amine sorbents, lines 3 and 5, begin to breakthrough at about 6 minutes while line 1, continues out to about 12 minutes prior to breakthrough. Therefore, the sorbent of the present invention has greater carbon dioxide cyclic capacity at ambient temperatures. During desorption, it can be seen that the sorbent of the present invention, line 1' desorbs a greater amount of carbon dioxide than either of the prior art sorbents 3' and 5' in the same amount of desorption time. Therefore, the sorbent of the present invention has a higher desorption rate which corresponds to a larger amount of carbon dioxide desorbed in a given time and temperature and therefore results in greater cyclical carbon dioxide capacities.

FIG. 2, which graphs equilibrium, further illustrates the improvement of the present invention over the prior art. The rate of absorption is much higher for the present invention, line 2, than the prior art sorbents, lines 4 and 6, since the prior art sorbents breakthrough at a much earlier time than the sorbent of the present invention.

The advantages of the sorbent and the carbon dioxide removal system of the present invention are numerous. Improvement of the desorption kinetics improves the carbon dioxide cyclic capacity of the sorbent. In the prior art, insufficient desorption of the carbon dioxide and water was experienced when adhering to established cycle times. The carbon dioxide and the water would be adsorbed, but due to the relatively slow rate of desorption, only a portion of the absorbed carbon dioxide and water would be desorbed. As a result, the amine complex would accumulate, thereby decreasing the capacity of the sorbent. Due to the high desorption rates of about 25% to about 35% greater than the prior art, higher carbon dioxide cyclic capacities are possible with the present invention.

Additional advantages realized by the sorbent of the present invention include increased sorbent life, ease of handling due to the relative absence of electrostatic charges, enhanced biocidal capability due to the presence of the polyols. Not only is the carbon dioxide cyclic capacity of the sorbent improved, but since the system is operated at temperatures below about 50° C., and typically at ambient temperatures, the oxidation problems experienced with the prior art sorbents are significantly reduced. In addition, the enhancement of carbon dioxide sorbent rates results in decreased weight, volume, and energy requirements.

Although this invention has been shown and described with respect to detailed embodiments thereof, it should be understood by those skilled in the art that various changes in form and detail thereof will be made without departing from the spirit and scope of the present invention.

We claim:

1. A regenerable carbon dioxide removal process comprising the steps of:
   a. passing a gaseous stream containing carbon dioxide through a sorbent bed, wherein said sorbent is formed from a supported amine-polyol sorbent having about 1 wt. % to about 25 wt. % polyol and about 1 wt. % to about 25 wt. % amine, with the balance being support;
   b. absorbing the carbon dioxide into said sorbent; and
   c. desorbing the absorbed carbon dioxide to regenerate the sorbent.

2. A regenerable carbon dioxide removal process as in claim 1, wherein said amine is 2-amino-2-methyl-1,3-propanediol, 2-hydroxyethyl piperazine, methyldiethanolamine, monoethanolamine, polyethylene imines, tetraethylenepentamine, triethanolamine, polyethylene imine, or mixtures thereof.

3. A regenerable carbon dioxide removal process as in claim 1, wherein said absorbed carbon dioxide is desorbed by heating said sorbent.

4. A regenerable carbon dioxide removal process as in claim 3, wherein said sorbent is heated to about 30° C. to about 50° C.

5. A regenerable carbon dioxide removal process as in claim 3, wherein said absorbed carbon dioxide is desorbed by reducing the carbon dioxide partial pressure environment to below about 0.1 mm Hg.

6. A regenerable carbon dioxide removal process as in claim 5 wherein said carbon dioxide partial pressure is reduced by applying a vacuum and/or employing a carbon dioxide lean sweep gas.

7. A regenerable carbon dioxide removal process as in claim 1, wherein said polyol is dimethyl ether of polyethylene glycol, glycerol, methoxy triethylene glycol diacetate, polyethylene glycol, propylene carbonate, 1, 2-propylene glycol, a sugar alcohol, or mixtures thereof.

* * * * *